United States Patent
Park

(10) Patent No.: US 9,304,181 B1
(45) Date of Patent: Apr. 5, 2016

(54) METHOD OF INSTALLING TERRESTRIAL BROADCAST SIGNAL RELAY APPARATUS

(71) Applicants: Ecopro ICT, Inc., Sungnam-si, Gyeonggi-do (KR); EPICT, Inc., Austin, TX (US)

(72) Inventor: Sang Il Park, Round Rock, TX (US)

(73) Assignees: ECOPRO ICT, INC., Gyeonggi-Do (KR); EPICT, INC., Austin, TX (US)

( * ) Notice: Subject to any disclaimer, the term of this patent is extended or adjusted under 35 U.S.C. 154(b) by 0 days.

(21) Appl. No.: 14/700,986

(22) Filed: Apr. 30, 2015

(51) Int. Cl.
*G01S 3/02* (2006.01)

(52) U.S. Cl.
CPC .......................................... *G01S 3/02* (2013.01)

(58) Field of Classification Search
CPC .......... G01S 3/02; H04W 4/00; H04W 24/00; H04W 56/00
USPC ....................................................... 342/457
See application file for complete search history.

(56) References Cited

U.S. PATENT DOCUMENTS

| 7,522,917 B1* | 4/2009 | Purdy et al. ................... 455/423 |
| 2008/0081553 A1* | 4/2008 | Kanda ............................ 455/7 |
| 2011/0250864 A1* | 10/2011 | Zussman ................... 455/404.2 |
| 2012/0034931 A1* | 2/2012 | Beck et al. ................ 455/456.1 |
| 2012/0207085 A1* | 8/2012 | Guguen et al. ............... 370/324 |
| 2015/0011208 A1* | 1/2015 | Terry, Scott ............... 455/435.1 |
| 2015/0109186 A1* | 4/2015 | Layson, Jr. ..................... 345/8 |

FOREIGN PATENT DOCUMENTS

| KR | 20070103770 A | * 10/2007 |
| WO | 2011136581 A2 | 11/2011 |

* cited by examiner

*Primary Examiner* — Harry Liu
(74) *Attorney, Agent, or Firm* — Hauptman Ham, LLP

(57) ABSTRACT

A method of installing a terrestrial broadcast signal relay apparatus having a wireless communication function includes connecting the broadcast signal relay apparatus and a mobile terminal having a GPS function with a wireless communication network, determining a location of the broadcast signal relay apparatus based on a location of the mobile terminal obtained by using the GPS function, determining a location of a nearest broadcast transmission tower based on the location of the broadcast signal relay apparatus, and determining an optimal location for installing the broadcast signal relay apparatus in a room based on the location of the nearest broadcast transmission tower.

10 Claims, 8 Drawing Sheets

METHOD OF INSTALLING TERRESTRIAL BROADCAST SIGNAL RELAY APPARATUS

BACKGROUND

1. Field

The present disclosure relates to a method of installing a broadcast signal relay apparatus, and more particularly, to a method of installing a broadcast signal relay apparatus, which receives a broadcast signal from a broadcast station and streams the broadcast signal to a display terminal in a wireless manner, at an optimal reception location.

2. Description of the Related Art

In general, a terrestrial broadcast receiver including an antenna, which is installed in a room and receives a broadcast signal transmitted from a broadcast station via an over-the-air broadcast network, is connected to a display terminal such as a television in a wired manner with a cable. For this reason, when a place for installing the display terminal is determined in the room, an area for installing the terrestrial broadcast receiver including antenna is limited within an area where the cable reaches due to the limited length of the cable, or vice versa.

With the above-mentioned terrestrial broadcast receiver connected to the display terminal via a cable, even when an optimal location exists, which provides a better broadcast signal reception, if the optimal over-the-air signal reception location is in a place where the broadcast receiver and the display terminal cannot be connected to each other due to the limited length of the cable, the broadcast receiver ends up with being installed in an area where the cable reaches, which may be far from the optimal over-the-air signal reception location, unless the installation place of the display terminal is changed. This causes the relative broadcast reception sensitivity to be decreased, and hence there may be a case where a high-quality terrestrial broadcast cannot be provided to a user.

FIG. 1 is a schematic diagram for illustrating an example of an installation area of the terrestrial broadcast receiver. As shown in FIG. 1, a broadcast receiver 10 is connected to a display terminal 20 such as a television in a wired manner via a cable CB. Therefore, when an installation place of the display terminal 20 is determined, a place where the terrestrial broadcast receiver 10 can be installed is limited within an installable region IR due to the limited length of the cable CB. When an optimal location for receiving the broadcast signal is outside the installable region IR, the broadcast receiver 10 cannot be installed at the optimal location unless the installation place of the display terminal 20 is changed, resulting in a situation that the broadcast receiver 10 is installed at a location where the over-the-air signal reception sensitivity is relatively low.

Further, the broadcast receiver 10 is generally connected in one-on-one to the display terminal 20, and hence the broadcast signal received by the broadcast receiver 10 is provided to only a single unit of the display terminal 20. To cope with this problem, a method of transmitting the broadcast signal to a plurality of personal display terminals 20 by using a signal distribution jack or the like may be employed. In this case, however, an additional device such as a signal distributor needs to be installed, which necessitates an additional work process.

International Publication No. WO-2011136581 describes a system for providing a service of various contents including real-time broadcast, contents on demand (COD), game, news, and the like by using an Internet network connected to a room, instead of the broadcast receiver that receives real-time contents from a broadcast station.

However, in the technology described in International Publication No. WO-2011136581, the contents are received from a server, and hence it is not suitable for a system for displaying a broadcast signal that is transmitted in real time from a broadcast station on a display terminal.

SUMMARY

A method of installing a terrestrial broadcast signal relay apparatus having a wireless communication function, according to some embodiments of the present disclosure, includes connecting the broadcast signal relay apparatus and a mobile terminal having a GPS function with a wireless communication network, determining a location of the broadcast signal relay apparatus based on a location of the mobile terminal obtained by using the GPS function, determining a location of a nearest broadcast transmission tower based on the location of the broadcast signal relay apparatus, and determining an optimal location for installing the broadcast signal relay apparatus in a room based on the location of the nearest broadcast transmission tower.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
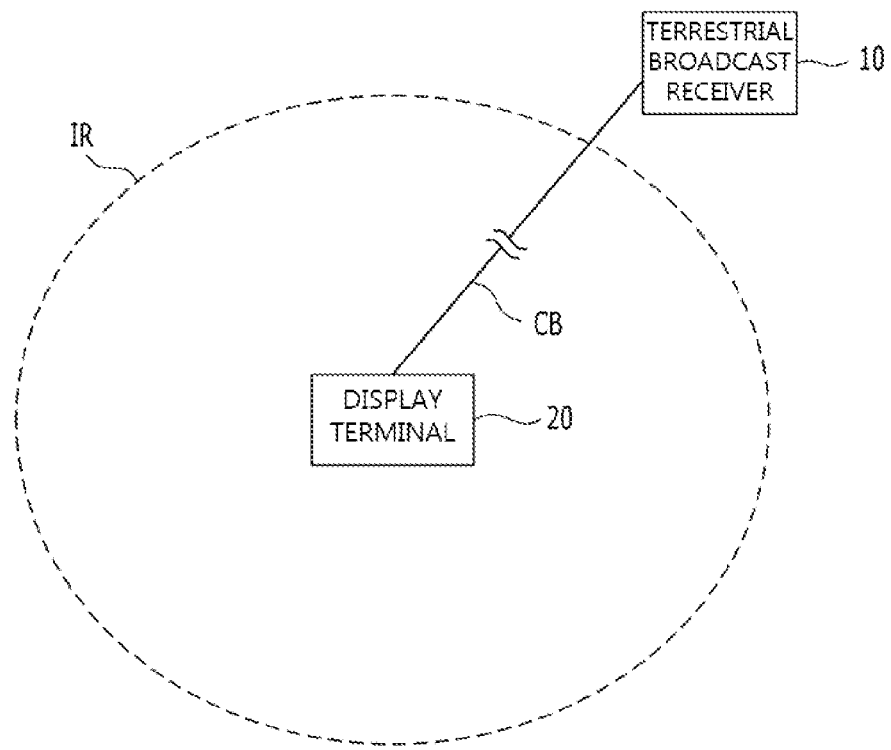
FIG. 1 is a schematic diagram for illustrating an example of an installation area of a terrestrial broadcast receiver.

Exemplary embodiments of the present disclosure are described in detail below with reference to the accompanying drawings. In the following descriptions, like reference numerals designate like elements although the elements are shown in different drawings. Further, detailed descriptions of known functions and configurations incorporated herein are omitted for the purpose of clarity and for brevity.

A terrestrial broadcast signal relay apparatus according to some embodiments of the present disclosure is described with reference to FIG. 2.

Figure 2:
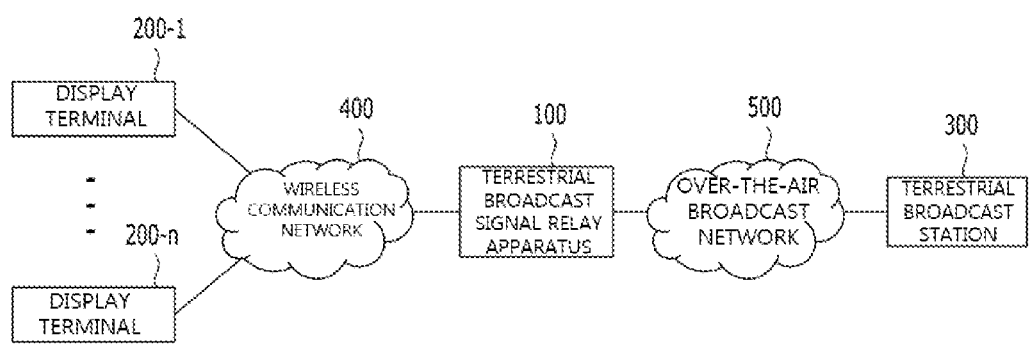
FIG. 2 is a schematic diagram for illustrating an operation of a terrestrial broadcast signal relay apparatus according to some embodiments of the present disclosure.

FIG. 2 is a schematic diagram for illustrating an operation of a terrestrial broadcast signal relay apparatus 100 according to some embodiments of the present disclosure.

As shown in FIG. 2, the terrestrial broadcast signal relay apparatus 100 is connected to a plurality of personal display terminals (200-1 to 200-n) (also collectively referred to as "display terminal 200") via a wireless communication network 400.

The broadcast signal relay apparatus 100 relays a broadcast signal from a terrestrial broadcast station 300 to the display terminal 200. That is, the broadcast signal relay apparatus 100 receives the terrestrial broadcast signal from the broadcast station 300, and streams the received broadcast signal to the display terminal 200 via the wireless communication network 400. In some embodiments, the broadcast signal relay apparatus 100 streams the broadcast signal to a plurality of personal display terminals 200-1 to 200-n.

The display terminal 200 receives the terrestrial broadcast signal from the broadcast signal relay apparatus 100 via the wireless communication network 400, and displays (outputs on a screen) the received terrestrial broadcast signal. The display terminal 200 includes a terminal equipped with a microprocessor including a memory unit and having a computational capability such as a television, a desktop computer, a laptop computer, a workstation, a palmtop computer, an ultra mobile personal computer (UMPC), a tablet, a personal digital assistant (PDA), a weblet, a smartphone, or a mobile phone.

The terrestrial broadcast station 300 broadcasts live terrestrial TV in real time. That is, the broadcast station 300 converts a terrestrial live TV program such as drama, news, film, or the like into a wireless broadcast signal, and transmits the wireless broadcast signal via a over-the-air broadcast network 500. The broadcast station 300 may use a broadcast satellite (not shown) to transmit the broadcast signal.

The wireless communication network 400 refers to a communication network for transmitting and receiving various data. The wireless communication network 400 includes a WiFi network. In some embodiments, the wireless communication network 400 includes a near field wireless communication network such as near field communication (NFC) and Bluetooth™.

The over-the-air broadcast network 500 is a broadcast network for transferring the broadcast signal transmitted from the broadcast station 300.

In this manner, the broadcast signal relay apparatus 100 streams the broadcast signal received from the terrestrial broadcast station 300 in an over-the-air manner to the display terminal 200 in a wireless manner without using a cable, and hence the broadcast signal relay apparatus 100 can be installed at the optimal location that provides a better terrestrial broadcast reception sensitivity. Therefore, a terrestrial broadcast reception condition can be improved.

Further, by streaming the broadcast signal to a plurality of personal display terminals 200-1 to 200-n, the efficiency of the broadcast signal relay apparatus 100 can be increased.

Figure 3:
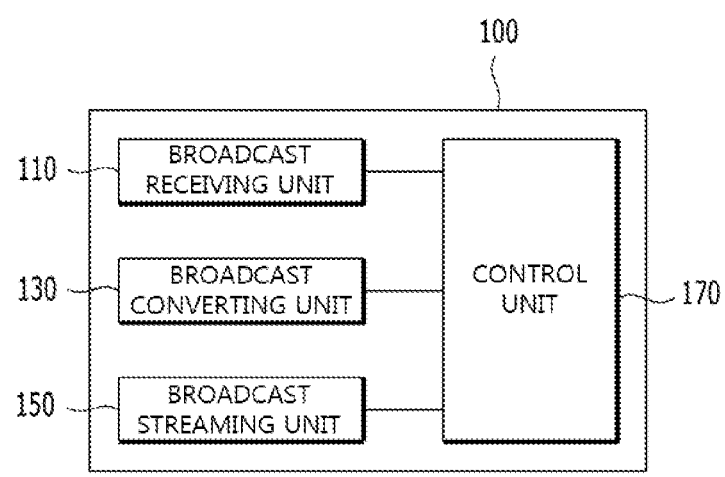
FIG. 3 is a block diagram of the terrestrial broadcast signal relay apparatus shown in FIG. 2.

Referring to FIG. 3, the broadcast signal relay apparatus 100 according to some embodiments of the present disclosure is described in detail.

FIG. 3 is a block diagram of the broadcast signal relay apparatus 100 shown in FIG. 2

As shown in FIG. 3, the broadcast signal relay apparatus 100 includes a broadcast receiving unit 110, a broadcast converting unit 130, a broadcast streaming unit 150, and a control unit 170.

The broadcast receiving unit 110 receives the broadcast signal from the broadcast station 300 via the over-the-air broadcast network 500.

The broadcast converting unit 130 converts a format of the terrestrial broadcast signal received by the broadcast receiving unit 110 into a format that is transmittable to the display terminal 200 via the wireless communication network 400. That is, the broadcast converting unit 130 converts a broadcast signal of a format that is usable in the terrestrial broadcast network 500 into a broadcast signal of a format that is usable in the wireless communication network 400. For example, when the wireless communication network 400 is a WiFi network, the broadcast converting unit 130 converts the terrestrial broadcast signal received by the broadcast receiving unit 110 into a format that is transmittable via the WiFi network.

The broadcast streaming unit 150 streams the broadcast signal received by the broadcast receiving unit 110 and converted by the broadcast converting unit 130 to the display terminal 200 via the wireless communication network 400. The display terminal 200 receives the broadcast signal and displays the received broadcast signal on a screen.

In some embodiments, the broadcast streaming unit 150 streams the broadcast signal received by the broadcast receiving unit 110 and converted by the broadcast converting unit 130 to the plurality of personal display terminals 200-1 to 200-n via the wireless communication network 400

In some embodiments, when streaming the broadcast signal with the format converted, the broadcast streaming unit 150 transmits format information of the broadcast signal before being converted to the display terminal 200. For example, the broadcast streaming unit 150 transmits the format information, and then streams the broadcast signal indicated by the format information. Upon receiving the format information while performing other process, the display terminal 200 suspends the other process, and performs a screen display of the broadcast signal, which has a relatively large process load, based on a format indicated by the format information.

In some embodiments, the broadcast streaming unit 150 adjusts a streaming speed depending on a reception condition of the broadcast signal. In some embodiments, the broadcast streaming unit 150 adjusts the streaming speed or image quality depending on the number of display terminals that perform the screen output of the broadcast signal. For example, the broadcast streaming unit 150 decreases the streaming speed or the image quality when the number of display terminals is large.

The control unit 170 controls overall operation of the broadcast signal relay apparatus 100. That is, the control unit 170 controls operations of the broadcast receiving unit 110, the broadcast converting unit 130, and the broadcast streaming unit 150, such that the broadcast signal transmitted from the broadcast station 300 is transferred to the display terminal 200.

In some embodiments, the control unit 170 performs an authentication of the display terminal 200, and when the authentication of the display terminal 200 is approved, streams the broadcast signal to the display terminal 200 with the authentication approved.

That is, the control unit 170 receives authentication request information from the display terminal 200 via the wireless communication network 400. The authentication request information includes information for identifying the display terminal 200.

The control unit 170 authenticates the display terminal 200 based on the received authentication request information. For example, if the display terminal 200 that transmitted the authentication request information is a terminal that registered in advance, the control unit 170 approves the authentication of the display terminal 200. On the other hand, if the display terminal 200 is a terminal that is not registered, the control unit 170 denies the authentication of the display terminal 200.

When the corresponding display terminal 200 is approved, the control unit 170 transmits authentication approval information to the corresponding display terminal 200 via the wireless communication network 400.

Thereafter, the control unit 170 streams the broadcast signal that is received by the broadcast receiving unit 110 and converted by the broadcast converting unit 130 to the display terminal 200 with the authentication approved via the broadcast streaming unit 150 in a wireless manner.

In some embodiments, the control unit 170 streams broadcast signal of a channel that is requested by the display terminal 200 with the authentication approved to the corresponding display terminal 200 in a wireless manner.

That is, the control unit 170 receives channel reception request information from the display terminal 200 with the authentication approved via the wireless communication network 400. The channel reception request information includes information for identifying the display terminal 200, information for identifying a desired broadcast channel.

Thereafter, the control unit 170 controls the broadcast receiving unit 110 to receive broadcast signal based on information for identifying a broadcast channel that is requested by the display terminal 200. The control unit 170 then streams the received broadcast signal to the display terminal 200 via the broadcast streaming unit 150 in a wireless manner.

Figure 4:
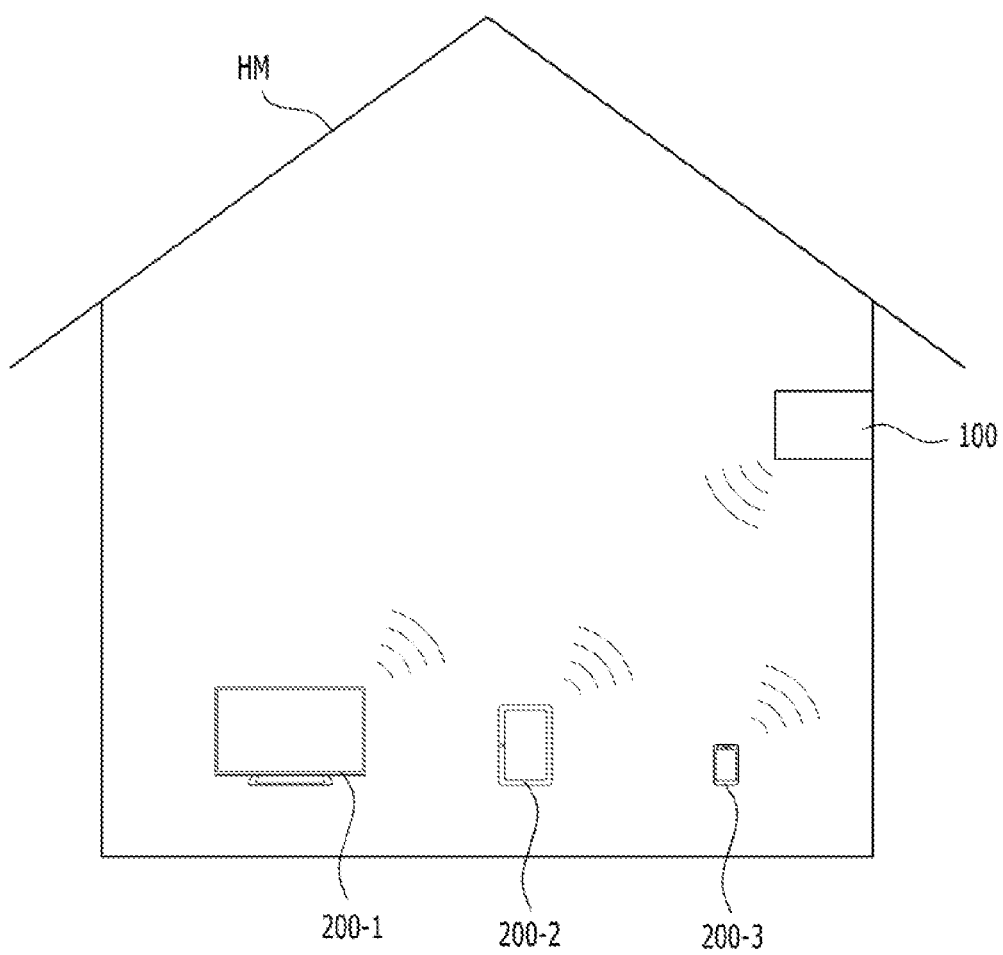
FIG. 4 is a schematic diagram for illustrating an example of a terrestrial broadcast signal relay operation of the broadcast signal relay apparatus according to some embodiments of the present disclosure.

Referring to FIG. 4, an example of the broadcast signal relay operation of the broadcast signal relay apparatus 100 is described in detail.

FIG. 4 is a schematic diagram for illustrating an example of the broadcast signal relay operation of the broadcast signal relay apparatus 100 according to some embodiments of the present disclosure. As shown in FIG. 4, the broadcast signal relay apparatus 100 is installed at the optimal location that provides a better broadcast reception sensitivity in a home HM, and a television 200-1, a tablet 200-2, and a smartphone 200-3 are located in the home HM.

The broadcast signal relay apparatus 100 is connected to the television 200-1, the tablet 200-2, and the smartphone 200-3 via the wireless communication network 400 without using a cable. Therefore, the broadcast signal relay apparatus 100 is capable of providing the received broadcast signal to the display terminal 200 without a distance constraint therebetween.

Figure 5:
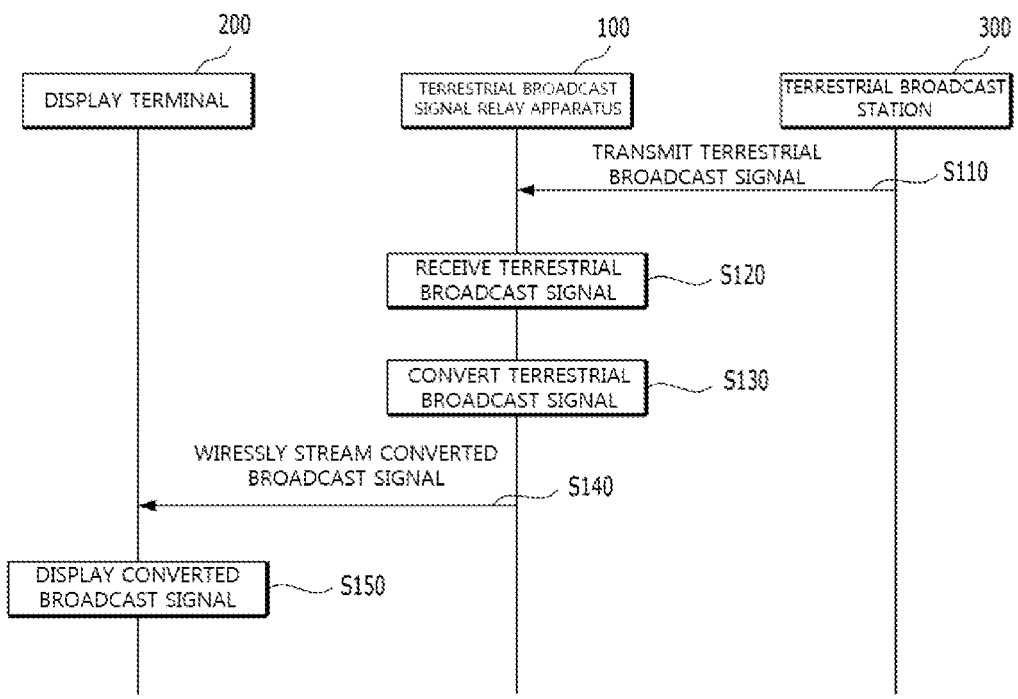
FIG. 5 is a schematic diagram for illustrating an example of a broadcast signal relay method according to some embodiments of the present disclosure.
Figure 6:
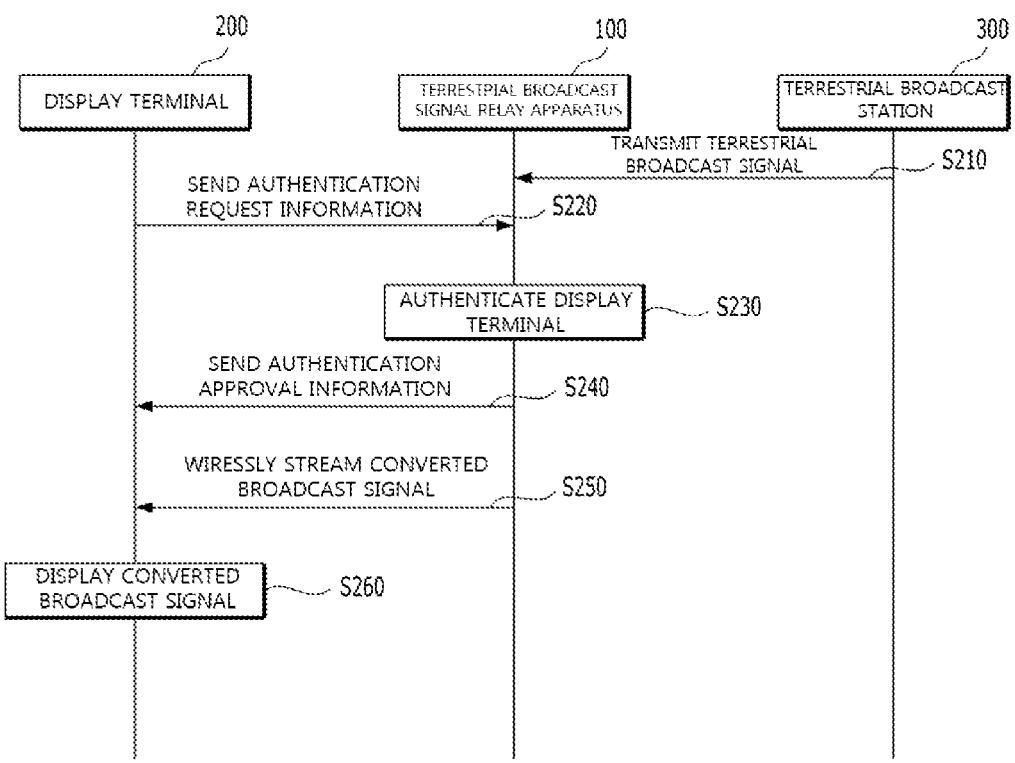
FIG. 6 is a schematic diagram for illustrating another example of the broadcast signal relay method according to some embodiments of the present disclosure.
Figure 7:
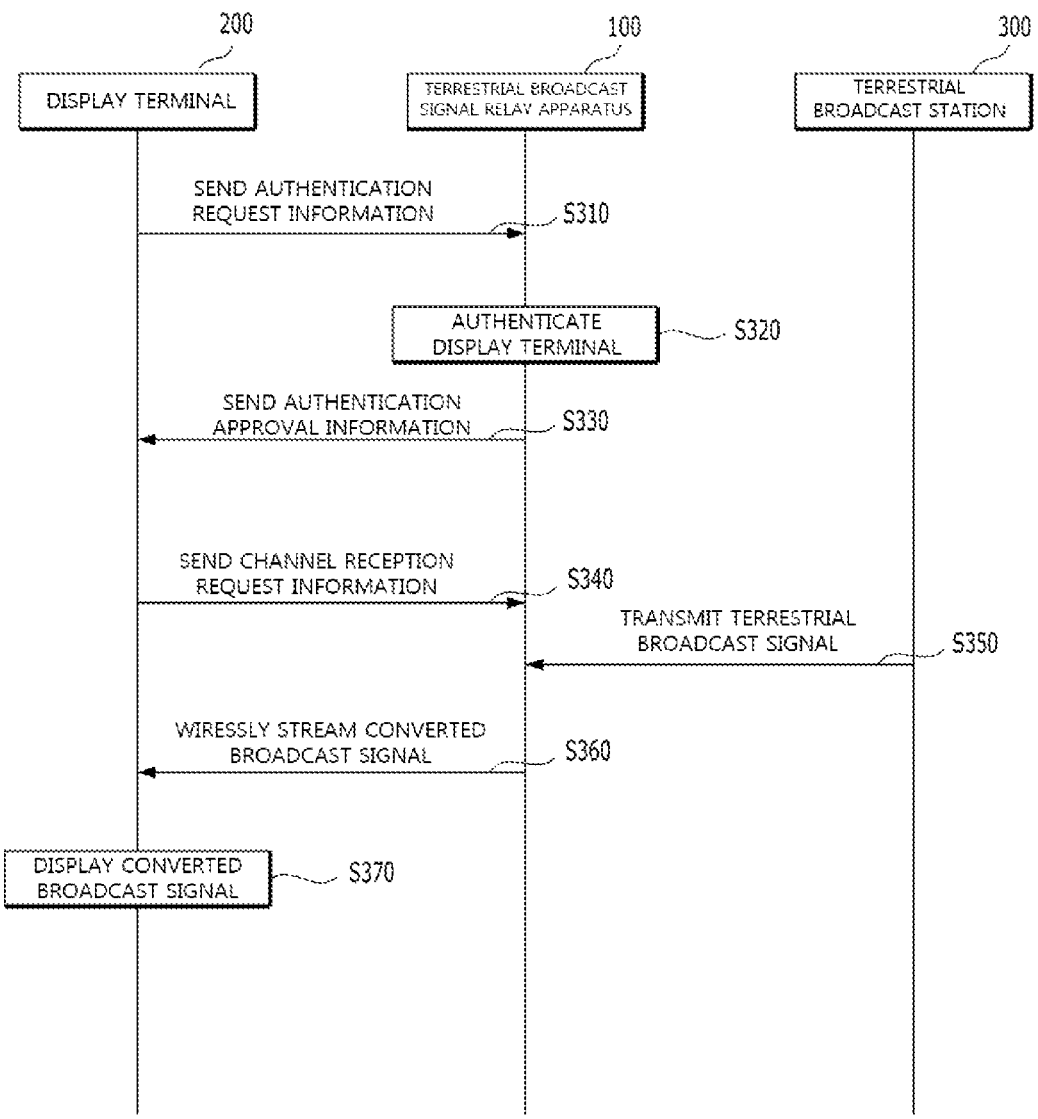
FIG. 7 is a schematic diagram for illustrating still another example of the broadcast signal relay method according to some embodiments of the present disclosure.

Referring to FIGS. 5 to 7, a broadcast signal relay method according to some embodiments of the present disclosure is described.

FIG. 5 is a schematic diagram for illustrating an example of the broadcast signal relay method according to some embodiments of the present disclosure.

At Step S110, the broadcast station 300 transmits a broadcast signal via the over-the-air broadcast network 500.

At Step S120, the broadcast signal relay apparatus 100 receives the broadcast signal transmitted from the broadcast station 300 via the over-the-air broadcast network 500. At Step S130, the broadcast signal relay apparatus 100 converts the received broadcast signal into a broadcast signal of a format that is transmittable to the display terminal 200 via the wireless communication network 400.

That is, the broadcast signal relay apparatus 100 converts a broadcast signal of a format that is transmittable via the over-the-air broadcast network 500 into a broadcast signal of a format that is transmittable via the wireless communication network 400. For example, when the wireless communication network 400 is a WiFi network, the broadcast signal relay apparatus 100 converts the received broadcast signal into a broadcast signal of a format that is transmittable via the WiFi network.

Thereafter, at Step S140, the broadcast signal relay apparatus 100 streams the broadcast signal to the display terminal 200 via the wireless communication network 400 in a wireless manner. In some embodiments, the broadcast signal relay apparatus 100 streams the broadcast signal to each of the plurality of personal display terminals 200-1 to 200-$n$ via the wireless communication network 400 in a wireless manner.

At Step S150, the display terminal 200 displays (screen outputs) the received broadcast signal.

In this manner, the broadcast signal relay apparatus 100 streams the broadcast signal received from the terrestrial broadcast station 300 in an over-the-air manner to the display terminal 200 via the wireless communication network 400 in a wireless manner without using a cable. Therefore, the broadcast signal relay apparatus 100 can be installed at the optimal location that provides a better broadcast reception sensitivity.

Further, by streaming the broadcast signal to each of the plurality of personal display terminals 200-1 to 200-$n$, the efficiency of the broadcast signal relay apparatus 100 can be increased.

FIG. 6 is a schematic diagram for illustrating another example of the broadcast signal relay method according to some embodiments of the present disclosure.

At Step S210, the broadcast station 300 transmits a broadcast signal via the over-the-air broadcast network 500.

Thereafter, at Step S220, the display terminal 200 transmits authentication request information to the broadcast signal relay apparatus 100 via the wireless communication network 400. At Step S230, the broadcast signal relay apparatus 100 receives the authentication request information, and authenticates the display terminal 200 based on the authentication request information.

When the authentication of the corresponding display terminal 200 is approved, at Step S240, the broadcast signal relay apparatus 100 transmits authentication approval information to the display terminal 200 via the wireless communication network 400.

Thereafter, at Step S250, the broadcast signal relay apparatus 100 streams the broadcast signal to the display terminal 200 with the authentication approved via the wireless communication network 400. At Step S260, the display terminal 200 displays the received broadcast signal (screen output). The steps of receiving the broadcast signal and converting the format of the broadcast signal in the broadcast signal relay apparatus 100 are omitted in FIG. 6, as these steps are similar to those shown in FIG. 5.

In some embodiments, when the authentication of the display terminal 200 is denied, the broadcast signal relay apparatus 100 streams the broadcast signal to a display terminal other than the display terminal 200 with the authentication denied (for example, a display terminal located near the broadcast signal for which the authentication is denied and that transmitted no authentication request information to the broadcast signal relay apparatus 100).

In this case, in some embodiments, the broadcast signal relay apparatus 100 streams the broadcast signal to the display terminal other than the display terminal 200 in a format that differs from the format of the broadcast signal intended to be transmitted to the display terminal 200 with the authentication denied. In some embodiments, the broadcast signal relay apparatus 100 streams a broadcast signal having image quality lower than the broadcast signal intended to be transmitted to the display terminal 200 with the authentication denied. In some embodiments, when the authentication is denied, the broadcast signal relay apparatus 100 selects other display terminal associated when the authentication is denied, and streams the broadcast signal to the selected display terminal.

FIG. 7 is a schematic diagram for illustrating still another example of the broadcast signal relay method according to some embodiments of the present disclosure.

At Step S310, the display terminal 200 transmits authentication request information to the broadcast signal relay apparatus 100 via the wireless communication network 400. At Step S320, the broadcast signal relay apparatus 100 authenticates the display terminal 200 based on the received authentication request information.

When the authentication of the display terminal 200 is approved, at Step S330, the broadcast signal relay apparatus 100 transmits authentication approval information to the display terminal 200 via the wireless communication network 400.

Thereafter, at Step S340, the display terminal 200 with the authentication approved transmits channel reception request information to the broadcast signal relay apparatus 100 via the wireless communication network 400.

At Step S350, the broadcast station 300 transmits the broadcast signal via the over-the-air broadcast network 500. The broadcast signal relay apparatus 100 receives the broadcast signal based on the channel reception request information via the over-the-air broadcast network 500. Thereafter, at Step S360, the broadcast signal relay apparatus 100 streams the broadcast signal to the display terminal 200 via the wireless communication network 400 in a wireless manner. Upon receiving the broadcast signal, at Step S370, the display terminal 200 displays the received broadcast signal on a screen. The steps of receiving the broadcast signal and converting the format of the broadcast signal at the broadcast signal relay apparatus 100 are omitted in FIG. 7, as these steps are similar to those shown in FIG. 5.

When installing the broadcast signal relay apparatus 100 according to some embodiments of the present disclosure in the home HM, as described below, a mobile terminal (not shown), such as a smartphone, having a GPS (global positioning system) function can be used.

Figure 8:
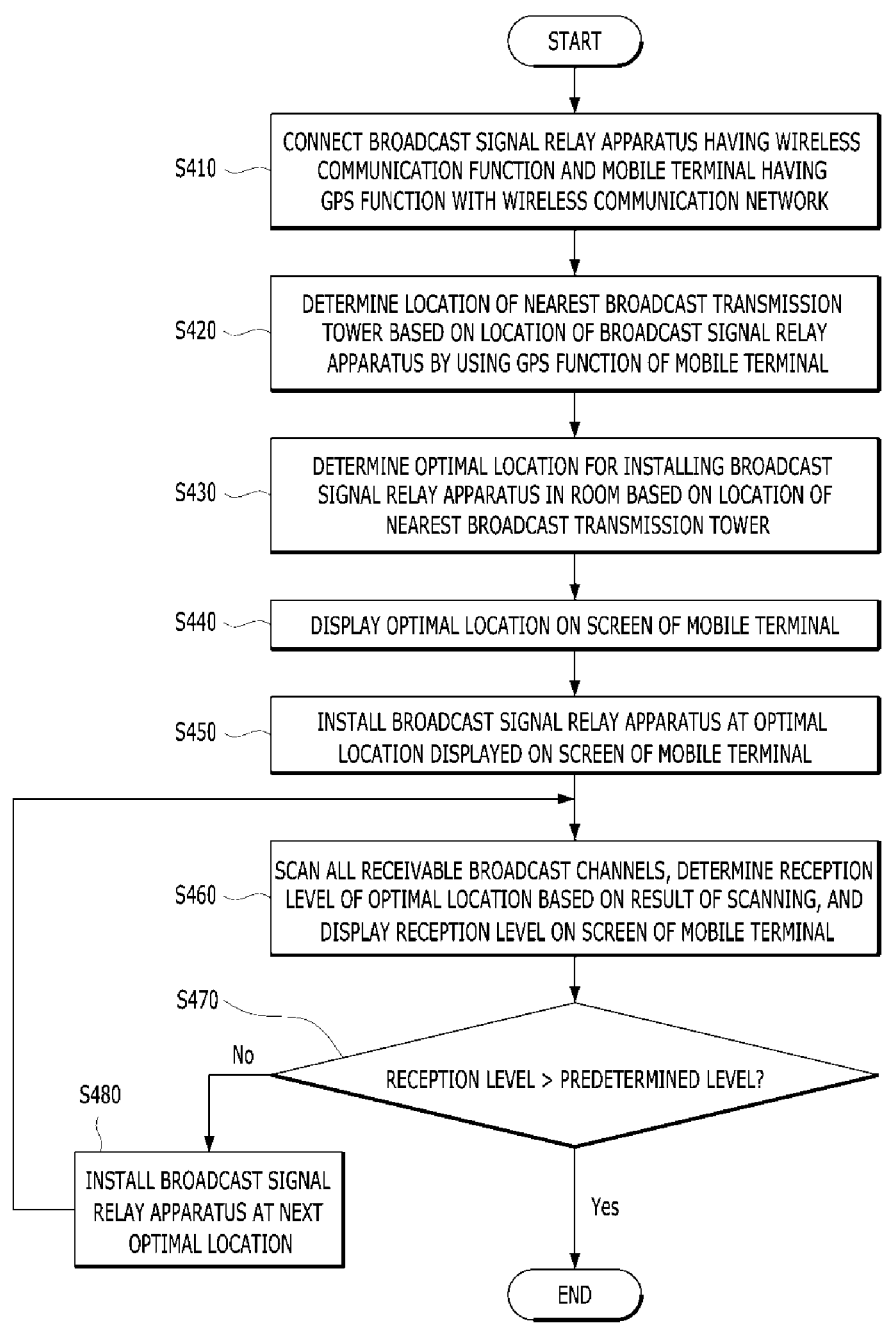
FIG. 8 is a flowchart of a method of installing a broadcast signal relay apparatus according to some embodiments of the present disclosure.

FIG. 8 is a flowchart of a method of installing a broadcast signal relay apparatus according to some embodiments of the present disclosure.

At Step S410, the broadcast signal relay apparatus 100 and the mobile terminal having the GPS function are connected to each other via a wireless communication network, such as the wireless communication network 400. Upon completing the connection, at Step S420, the control unit 170 or the mobile terminal determines a location of the broadcast signal relay apparatus 100 by using the GPS function of the mobile terminal, and determines a location of the nearest terrestrial television transmission tower based on the location of the broadcast signal relay apparatus 100.

In some embodiment of the present disclosure, the mobile terminal determines a location of the mobile terminal by using the GPS function, assumes that a distance between the mobile terminal and the broadcast signal relay apparatus 100 is shorter than a predetermined distance, and determines the location of the mobile terminal as the location of the broadcast signal relay apparatus 100.

In some embodiment of the present disclosure, when a strength of a wave received from the broadcast signal relay apparatus 100 is equal to or larger than a predetermined value, the mobile terminal determines the location of the mobile terminal as the location of the broadcast signal relay apparatus 100. On the other hand, when the strength of the wave received from the broadcast signal relay apparatus 100 is smaller than the predetermined value, the mobile terminal assumes that the location of the broadcast signal relay apparatus 100 differs from the location of the mobile terminal, and searches for the location of the broadcast signal relay apparatus 100.

For example, the mobile terminal determines a direction of receiving the wave from the broadcast signal relay apparatus 100 based on the strength of the wave, and determines a distance between the mobile terminal and the broadcast signal relay apparatus 100 based on the strength of the wave. The mobile terminal determines the location of the broadcast signal relay apparatus 100 based on the location of the mobile terminal obtained by using the GPS function, the direction of receiving the wave, and the distance between the mobile terminal and the broadcast signal relay apparatus 100.

At Step S430, an optimal reception location in the home HM is determined based on the location of the nearest television transmission tower, and then the determined optimal reception location is displayed on a screen of the mobile terminal (Step S440). In some embodiments of the present disclosure, the mobile terminal displays an area on a side of the nearest television transmission tower with respect to the location of the broadcast signal relay apparatus 100 on the screen as the optimal reception location. In some embodiments of the present disclosure, the mobile terminal displays a location on a side of the nearest television transmission tower with respect to the broadcast signal relay apparatus 100 on a line connecting the location of the nearest television transmission tower and the location of the broadcast signal relay apparatus 100 on the screen as the optimal reception location.

In some embodiments of the present disclosure, when determining the optimal reception location in the home HM for installing the broadcast signal relay apparatus 100, a plurality of candidate locations for the optimal reception location is determined and displayed on the screen of the mobile terminal.

In some embodiments of the present disclosure, the step of determining the optimal reception location for installing the broadcast signal relay apparatus 100 in the room includes displaying a candidate location included in the area on the side of the nearest television transmission tower with respect to the broadcast signal relay apparatus 100 from among the plurality of candidate locations as the optimal reception location. When a plurality of candidate locations is included in the area on the side of the nearest television transmission tower (for example, a first candidate location and a second candidate location), the mobile terminal displays a candidate location nearest to the location of the nearest television transmission tower as the optimal reception location on the screen. In some embodiments of the present disclosure, the mobile terminal displays, together with the optimal reception location, a layout of the room or the home to install the broadcast signal relay apparatus 100, which is stored in the memory in advance.

In some embodiments of the present disclosure, an installation application is pre-installed in the mobile terminal, and information on locations of television transmission towers are stored in the memory of the mobile terminal in advance. Although steps of turning on the mobile terminal and starting the installation application are omitted in FIG. 8, in some embodiments of the present disclosure, these steps can be performed in a mode of plug-in type in which the installation application starts automatically when the broadcast signal relay apparatus 100 and the mobile terminal are connected to each other via the wireless communication network. When the installation application does not automatically start, the installation application is started in a manual mode in which a user starts the installation application after turning on the mobile terminal.

At Step S450, the broadcast signal relay apparatus 100 is installed at the optimal reception location displayed on the screen of the mobile terminal. At Step S460, all receivable broadcast channels are scanned by using a television tuning function, determine a reception level of the optimal reception location based on a result of the scanning, and the reception level is displayed on the screen of the mobile terminal, for evaluating the reception level.

Upon detecting the installation, the broadcast signal relay apparatus 100 scans all the receivable broadcast channel by using a television tuning function, determines the reception level of at the reception location based on the result of the scanning, and transmits the reception level to the mobile terminal. The mobile terminal displays the reception level on the screen, by which a user evaluates the reception level at the installation location. In some embodiments of the present disclosure, the mobile terminal evaluates the reception level and displays a result of the evaluation on the screen.

When the reception level displayed on the screen of the mobile terminal is equal to or higher than a predetermined level (YES at Step S470), it is determined that the broadcast signal relay apparatus 100 is installed at the optimal location for providing a better broadcast reception sensitivity, and after performing a fine tuning of the location, the installation of the broadcast signal relay apparatus 100 is completed.

On the other hand, when the reception level displayed on the screen of the mobile terminal is lower than the predetermined level (NO at Step S470), it is determined that the broadcast signal relay apparatus 100 is not installed at the optimal location for providing a better broadcast reception sensitivity, and at Step S480, the broadcast signal relay apparatus 100 is re-installed at the next optimal reception location.

Specifically, the mobile terminal displays the next optimal reception location on the screen. The user re-installs the broadcast signal relay apparatus 100 at the next optimal reception location displayed on the screen of the mobile terminal. In some embodiments, the next optimal reception location is a candidate location farthest from the previous optimal reception location from among the plurality of candidate locations included in the area on the side of the nearest television transmission tower with respect to the broadcast signal relay apparatus 100. In some embodiments of the present disclosure, the next optimal reception location is a candidate location closest to the previous optimal reception location from among the plurality of candidate locations included in the area on the side of the nearest television transmission tower with respect to the broadcast signal relay apparatus 100.

Thereafter, the process returns to Step S460, to repeat Steps S460 to S480 until the reception level becomes equal to or higher than the predetermined level.

As described above, according to some embodiments of the present disclosure, the optimal reception location that provides a better broadcast reception sensitivity can be found with ease, and hence the broadcast signal relay apparatus can be constantly installed at the optimal location.

Some embodiments of the present disclosure can be implemented as a code, which is readable by a computer, on computer-readable recording medium. The computer-readable recording medium includes all types of recording devices that can store data. An example of the computer-readable recording medium includes one implemented in a form of carrier wave (transmitted through the Internet) as well as ROM, RAM, CD-ROM, magnetic tape, flexible disk, optical data storage device, and the like. The computer-readable recording medium can be distributed to computer devices connected to a wired or wireless communication network, and stored and executed as a code that is readable by a computer in a distributed manner.

It is an object of the present invention to provide a method of installing a broadcast signal relay apparatus, which receives a broadcast signal from a broadcast station and streams the broadcast signal to a display terminal in a wireless manner, at an optimal reception location.

The technical problems to be solved by the present disclosure are not limited to the above-mentioned, but other technical problems not mentioned above can be clearly understood by one of ordinary skill in the pertinent art from the following descriptions.

As described above, according to some embodiments of the present disclosure, the optimal location that provides a better broadcast reception sensitivity can be found with ease, and hence the broadcast signal relay apparatus can be constantly installed at the optimal location.

Further, according to some embodiments of the present disclosure, the broadcast signal is streamed to a plurality of personal display terminals, and hence the efficiency of the broadcast signal relay apparatus can be increased.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. A method of installing a terrestrial broadcast signal relay apparatus having a wireless communication function, the method comprising:

connecting the terrestrial broadcast signal relay apparatus and a mobile terminal having a GPS (global positioning system) function with a wireless communication network;

first determining including determining, by using the mobile terminal, a location of the terrestrial broadcast signal relay apparatus based on a location of the mobile terminal obtained by using the GPS function;

second determining including determining, by using the mobile terminal, a location of a nearest terrestrial broadcast transmission tower based on the location of the terrestrial broadcast signal relay apparatus and locations of a plurality of terrestrial broadcast transmission towers stored in a memory;

third determining including determining, by using the mobile terminal, a location included in an area on a side of the nearest terrestrial broadcast transmission tower with respect to the location of the terrestrial broadcast signal relay apparatus based on a relationship between the location of the nearest terrestrial broadcast transmission tower and the location of the terrestrial broadcast signal relay apparatus; and displaying, on a screen of the mobile terminal, a message that the location included in the area is an optimal location for installing the terrestrial broadcast signal relay apparatus.

2. The method according to claim 1, further comprising:

installing the terrestrial broadcast signal relay apparatus at the optimal location displayed on the screen of the mobile terminal; and evaluating a reception level, including scanning, by using the terrestrial broadcast signal relay apparatus all receivable terrestrial broadcast channels, fourth determining including determining, by using the terrestrial broadcast signal relay apparatus, the reception level of the optimal location based on a result of the scanning, and displaying the reception level on the screen of the mobile terminal.

3. The method according to claim 2, wherein the third determining includes determining a plurality of candidate locations including at least a first candidate location and a second candidate location for the location included in the area, the installing includes installing the terrestrial broadcast signal relay apparatus at the first candidate location, the evaluating includes performing the evaluating for the first candidate location, and when the reception level for the first candidate location is below a predetermined level, the installing further includes reinstalling the terrestrial broadcast signal relay apparatus at the second candidate location.

4. The method according to claim 3, further comprising repeating the reinstalling and the evaluating until the reception level is equal to or higher than the predetermined level.

5. The method according to claim 1, wherein the terrestrial broadcast signal relay apparatus includes a terrestrial broadcast receiving unit configured to receive a terrestrial broadcast signal from a terrestrial broadcast station via an over-the-air broadcast network, and a terrestrial broadcast streaming unit configured to stream the terrestrial broadcast signal to a display terminal via a wireless communication network.

6. The method according to claim 5, wherein the terrestrial broadcast signal relay apparatus further includes a terrestrial broadcast converting unit configured to convert a format of the terrestrial broadcast signal received by the terrestrial broadcast receiving unit into a format that is transmittable via the wireless communication network, and the terrestrial broadcast streaming unit is configured to stream the terrestrial broadcast signal of which the format is converted by the terrestrial broadcast converting unit to the display terminal via the wireless communication network.

7. The method according to claim 5, wherein the wireless communication network includes a WiFi network.

8. The method according to claim 5, wherein the terrestrial broadcast signal relay apparatus further includes a control unit configured to receive authentication request information from the display terminal via the wireless communication network, when the authentication of the display terminal is approved, to send authentication approval information to the display terminal via the wireless communication network, and to cause the terrestrial broadcast streaming unit to stream the terrestrial broadcast signal to the display terminal with the authentication approved via the wireless communication network.

9. The method according to claim 8, the control unit is configured to receive channel reception request information from the display terminal with the authentication approved via the wireless communication network, to cause the terrestrial broadcast receiving unit to receive the terrestrial broadcast signal based on the channel reception request information, and to cause the terrestrial broadcast streaming unit to stream the terrestrial broadcast signal received based on the channel reception request information to the display terminal via the wireless communication network.

10. The method according to claim 5, wherein the display terminal includes a plurality of personal display terminals, and the terrestrial broadcast streaming unit is configured to stream the terrestrial broadcast signal to each of the plurality of personal display terminals via the wireless communication network.

* * * * *